(12) United States Patent
Luo et al.

(10) Patent No.: US 11,689,058 B2
(45) Date of Patent: Jun. 27, 2023

(54) Q-FACTOR DETERMINATION APPARATUS AND METHOD FOR WIRELESS POWER TRANSFER SYSTEM

(71) Applicant: NuVolta Technologies (Hefei) Co., Ltd., Hefei (CN)

(72) Inventors: Zhijun Luo, Shanghai (CN); Yingying Yang, Hefei (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 130 days.

(21) Appl. No.: 17/195,949

(22) Filed: Mar. 9, 2021

(65) Prior Publication Data
US 2022/0255354 A1 Aug. 11, 2022

(30) Foreign Application Priority Data

Feb. 7, 2021 (CN) .......................... 202110177200.4

(51) Int. Cl.
*H02J 50/12* (2016.01)
*H02J 50/60* (2016.01)

(52) U.S. Cl.
CPC .............. *H02J 50/12* (2016.02); *H02J 50/60* (2016.02)

(58) Field of Classification Search
None
See application file for complete search history.

(56) References Cited

U.S. PATENT DOCUMENTS

2020/0381960 A1* 12/2020 Goodchild ............ H02J 50/402

FOREIGN PATENT DOCUMENTS

CN 103283133 A * 9/2013 ............ H02M 3/337

* cited by examiner

*Primary Examiner* — Daniel Kessie
*Assistant Examiner* — Terrence R Willoughby
(74) *Attorney, Agent, or Firm* — Li Li; AP3 Law Firm PLLC (57) ABSTRACT

A method includes applying an excitation including a voltage step to a resonant tank comprising a first coil and a capacitor, comparing a damped sinusoidal waveform having a resonant attenuation envelope with a predetermined threshold voltage and detecting a last time instant at which a value of the damped sinusoidal waveform is equal to the predetermined threshold voltage, calculating a quality factor of the resonant tank based on a plurality of parameters derived from the last time instant, and determining whether a foreign object is magnetically coupled to the first coil based on the quality factor.

19 Claims, 6 Drawing Sheets

Q-FACTOR DETERMINATION APPARATUS AND METHOD FOR WIRELESS POWER TRANSFER SYSTEM

PRIORITY CLAIM

This application claims priority to Chinese Patent Application No. 202110177200.4, filed on Feb. 7, 2021, which is hereby incorporated by reference in its entirety.

TECHNICAL FIELD

The present invention relates to a quality factor determination apparatus and method, and, in particular embodiments, to a quality factor determination apparatus for a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In a wireless power transfer system, energy transferring is intended to occur between the primary side transmitter and the secondary side receiver. Foreign objects placed between or adjacent to the primary side transmitter and the secondary side receiver may cause unnecessary power dissipation, thereby reducing the power transfer efficiency in the wireless power transfer system. As power transfer efficiency has become more important, it would be desirable to have a simple and reliable foreign object detection apparatus and method to provide a fast and accurate solution under a variety of operating conditions.

SUMMARY

These and other problems are generally solved or circumvented, and technical advantages are generally achieved, by preferred embodiments of the present disclosure which provide a quality factor determination apparatus for a wireless power transfer system.

In accordance with an embodiment, a method comprises applying an excitation including a voltage step to a resonant tank comprising a first coil and a capacitor, comparing a damped sinusoidal waveform having a resonant attenuation envelope with a predetermined threshold voltage and detecting a last time instant at which a value of the damped sinusoidal waveform is equal to the predetermined threshold voltage, calculating a quality factor of the resonant tank based on a plurality of parameters derived from the last time instant, and determining whether a foreign object is magnetically coupled to the first coil based on the quality factor.

In accordance with another embodiment, a method comprises connecting a dc voltage source to a power stage of a wireless power transfer system, disconnecting the dc voltage source from the power stage, wherein after disconnecting the dc voltage source, a damped sinusoidal waveform is generated in a resonant tank of the wireless power transfer system, detecting a last time instant at which a value of the damped sinusoidal waveform is equal to a predetermined threshold voltage, and calculating a quality factor of the resonant tank based on a plurality of parameters derived from the last time instant.

In accordance with yet another embodiment, an apparatus comprises a power conversion device coupled to a resonant tank comprising a capacitor and a first coil connected in series, and a controller configured to apply an excitation to the capacitor and the first coil through the power conversion device, detect a signal having a resonant attenuation envelope, compare the signal with a predetermined threshold voltage, and detect a last time instant at which a value of the signal is equal to the predetermined threshold voltage, and wherein the controller is configured to determine a quality factor based on the last time instant.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a quality factor determination apparatus for a wireless power transfer system. The invention may also be applied, however, to a variety of power systems. Hereinafter, various embodiments will be explained in detail with reference to the accompanying drawings.

Figure 1:
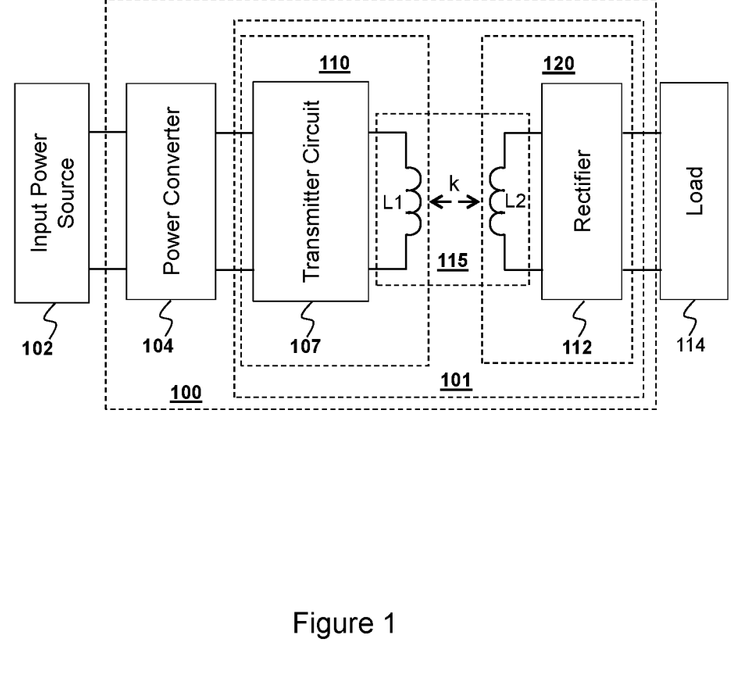
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. The wireless power transfer device 101 includes a transmitter 110 and a receiver 120. As shown in FIG. 1, the transmitter 110 comprises a transmitter circuit 107 and a transmitter coil L1 connected in cascade. The input of the transmitter circuit 107 is coupled to an output of the power converter 104. The receiver 120 comprises a receiver coil L2 and a rectifier 112 connected in cascade. The output of the rectifier 112 is coupled to the load 114.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, power may be transferred from the transmitter 110 to the receiver 120.

In some embodiments, the transmitter 110 may be inside a charging pad. The transmitter coil is placed underneath the top surface of the charging pad. The receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120.

The transmitter circuit 107 may comprise primary side switches of a full-bridge power converter according to some embodiments. The full-bridge is also known as an H-bridge. Alternatively, the transmitter circuit 107 may comprise the primary side switches of other converters such as a half-bridge converter, a push-pull converter and the like. The detailed configuration of the transmitter circuit 107 will be described below with respect to FIG. 2.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier 112. The receiver 120 may comprise a secondary resonant capacitor.

The rectifier 112 converts an alternating polarity waveform received from the output of the receiver coil L2 to a single polarity waveform. In some embodiments, the rectifier 112 is implemented as a synchronous rectifier including four switches. In alternative embodiments, the rectifier 112 comprises a full-wave diode bridge and an output capacitor.

Furthermore, the synchronous rectifier may be formed by any controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed structure of the rectifier 112 will be discussed below with respect to FIG. 2.

The power converter 104 is coupled between the input power source 102 and the input of the wireless power transfer device 101. Depending design needs and different applications, the power converter 104 may comprise many different configurations. In some embodiments, the power converter 104 may be a non-isolated power converter such as a buck converter. In some embodiments, the power converter 104 may be implemented as a linear regulator. In some embodiments, the power converter 104 may be an isolated power converter such as a forward converter.

The implementation of the power converter 104 described above is merely an example, which should not unduly limit the scope of the claims. One of ordinary skill in the art would recognize many variations, alternatives, and modifications. Furthermore, depending on different applications and design needs, the power converter 104 may be an optional element of the wireless power transfer system 100. In other words, the input power source 102 may be connected to the transmitter circuit 107 directly.

Figure 2:
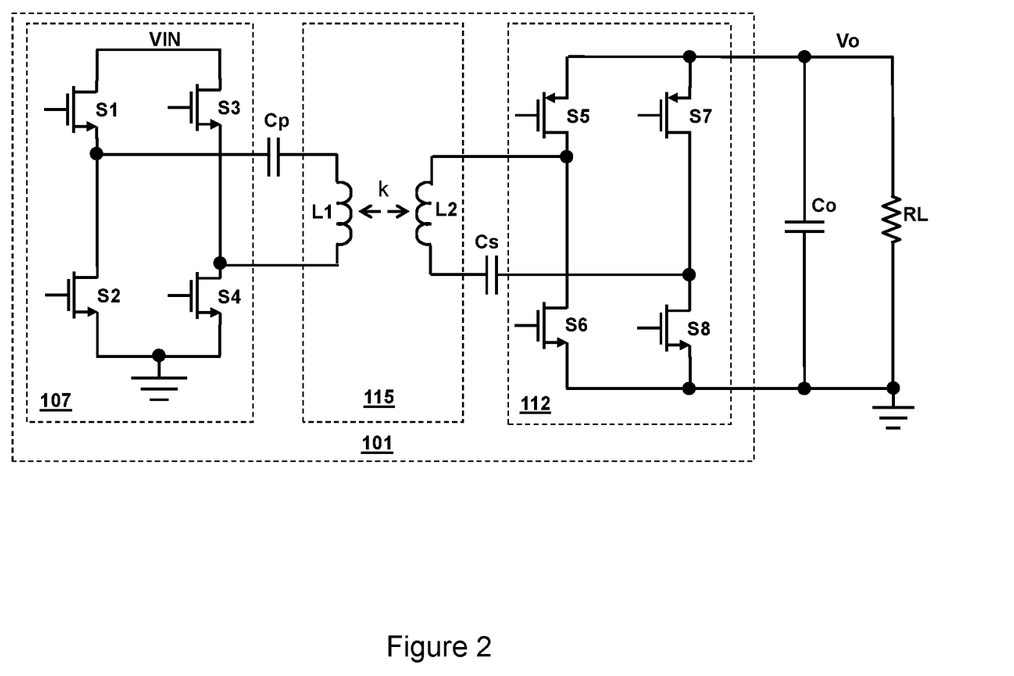
FIG. 2 illustrates a schematic diagram of the wireless power transfer system shown in FIG. 1 in accordance with various embodiments of the present disclosure.

FIG. 2 illustrates a schematic diagram of the wireless power transfer system shown in FIG. 1 in accordance with various embodiments of the present disclosure. The wireless power transfer device 101 comprises a transmitter circuit 107, a resonant capacitor Cp, a loosely coupled transformer 115, a resonant capacitor Cs and a rectifier 112 connected in cascade. The loosely coupled transformer 115 is formed by the transmitter coil L1 and the receiver coil L2. The transmitter circuit 107 is implemented as a full-bridge as shown in FIG. 2. Throughout the description, the full-bridge shown in FIG. 2 may be alternatively referred to as a power stage.

The full-bridge 107 includes four switching elements, namely S1, S2, S3 and S4. As shown in FIG. 2, the switching elements S1 and S2 are connected in series between an input voltage bus VIN and ground. The input voltage bus VIN is connected to the output of the power converter 104 shown in FIG. 1. Likewise, the switching elements S3 and S4 are connected in series between the input voltage bus VIN and ground. The common node of the switching elements S1 and S2 is coupled to a first input terminal of the transmitter coil L1 through the resonant capacitor Cp. The common node of the switching elements S3 and S4 is coupled to a second input terminal of the transmitter coil L1.

According to some embodiments, the switching elements S1, S2, S3 and S4 are implemented as MOSFET or MOSFETs connected in parallel, any combinations thereof and/or the like. According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge 107 shown in FIG. 2), the implementation of the transmitter circuit 107 shown in FIG. 2 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge 107 illustrated herein is limited solely for the purpose of clearly illustrating the inventive aspects of the various embodiments. The present invention is not limited to any particular power topology.

It should further be noted that while FIG. 2 illustrates four switches S1-S4, various embodiments of the present disclosure may include other variations, modifications and alternatives. For example, a separate capacitor may be connected in parallel with each switch of the full-bridge 107. Such a separate capacitor helps to better control the timing of the resonant process of the full-bridge 107.

The outputs of the receiver coil L2 are coupled to the load RL through the resonant capacitor Cs, the rectifier 112 and a capacitor Co. The rectifier converts an alternating polarity waveform received from the outputs of the receiver coil L2 to a single polarity waveform. The capacitor Co is employed to attenuate noise and provide a steady output voltage. The resonant capacitor Cs helps to achieve soft switching for the wireless power transfer system.

In some embodiments, the rectifier 112 is implemented as a synchronous rectifier. The rectifier 112 includes four switching elements, namely S5, S6, S7 and S8. As shown in FIG. 2, the switching elements S5 and S6 are connected in series between the output terminal of the rectifier 112 and ground. Likewise, the switching elements S7 and S8 are connected in series between the output terminal of the rectifier 112 and ground. As shown in FIG. 2, the common node of the switching elements S5 and S6 is coupled to a first terminal of the receiver coil L2. The common node of the switching elements S7 and S8 is coupled to a second terminal of the receiver coil L2 through the resonant capacitor Cs.

According to some embodiments, the switching elements S5, S6, S7 and S8 are implemented as MOSFET or MOSFETs connected in parallel, any combinations thereof and/or the like.

Figure 3:
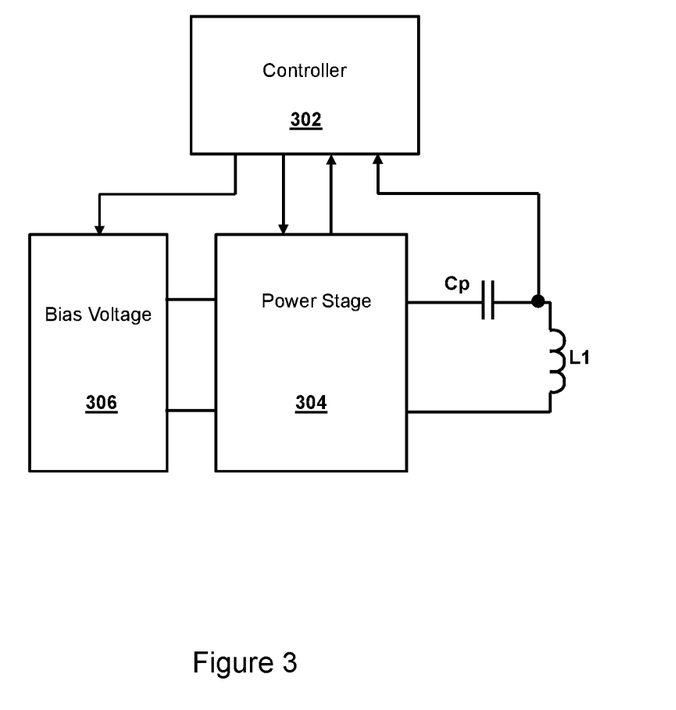
FIG. 3 illustrates an apparatus for applying an excitation to the resonant tank of the wireless power transfer system shown in FIG. 1 in accordance with various embodiments of the present disclosure.

FIG. 3 illustrates an apparatus for applying an excitation to the resonant tank of the wireless power transfer system shown in FIG. 1 in accordance with various embodiments of the present disclosure. The apparatus comprises a controller 302, a power stage 304, a bias voltage source 306, a capacitor Cp and a first coil L1. In some embodiments, the power stage 304 is implemented as the full-bridge converter shown in FIG. 2. The bias voltage source 306 is a dc power source configured to provide a dc voltage. The dc voltage is employed to generate an excitation applied to the resonant tank formed by the capacitor Cp and the first coil L1.

As shown in FIG. 3, the power stage 304 is coupled to the first coil L1 through the capacitor Cp. The controller 302 is coupled to the power stage 304 and the bias voltage source 306. As shown in FIG. 3, the controller 302 is configured to receive various operating parameters from the power stage 304, and generate a plurality of operating commands to control the power stage 304 and the bias voltage source 306.

In operation, a foreign object (e.g., a coin) may be magnetically coupled to the first coil L1. In order to operate the wireless power transfer system reliably, the controller 302 may configure the bias voltage source 306 and the power stage 304 such that an excitation (e.g., a voltage step) is applied to the resonant tank formed by Cp and L1. Applying an excitation to the resonant tank will be described in detail below with respect to FIG. 4. In response to this excitation, a signal having a damped sinusoidal waveform is generated in the resonant tank. The controller 302 detects this signal (e.g., detecting the voltage across L1). Based on the detected signal, an algorithm is employed to calculate the quality factor of the resonant tank. The algorithm for calculating the quality factor of the resonant tank will be described in detail below with respect to FIG. 5. Based on the quality factor, the controller 302 is able to determine whether a foreign object is magnetically coupled to L1.

It should be noted that the system architecture shown in FIG. 3 is based on a power transmitter (PTX). This system architecture shown in FIG. 3 is merely an example, which should not unduly limit the scope of the claims. One of ordinary skill in the art would recognize many variations, alternatives, and modifications. For example, the foreign object detection method described above may be applicable to other wireless power transfer systems such as a reverse wireless charging system in which a power receiver of a mobile phone is configured as a power transmitter.

Figure 4:
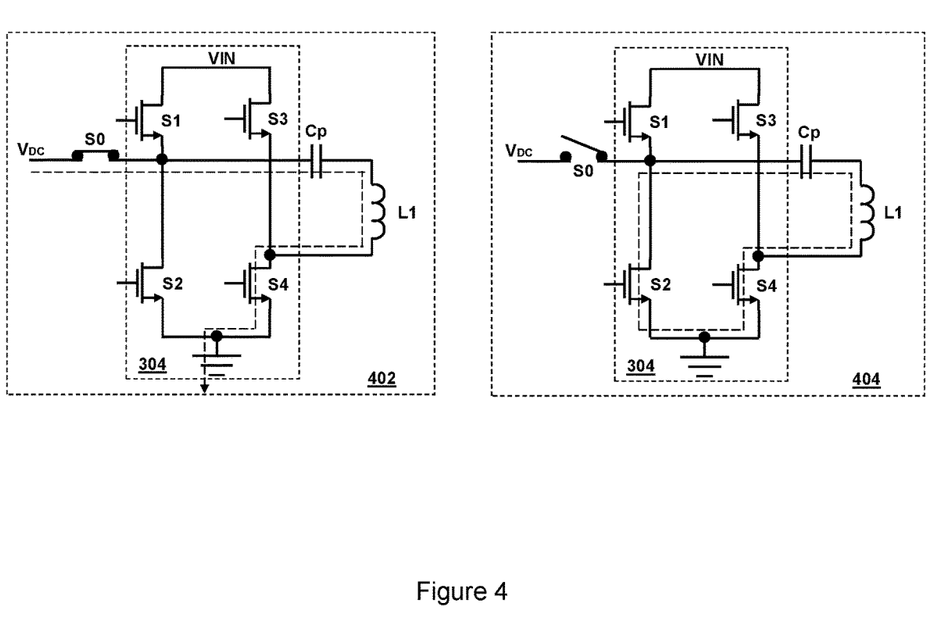
FIG. 4 illustrates a schematic diagram of the apparatus for applying the excitation to the resonant tank of the wireless power transfer system in accordance with various embodiments of the present disclosure.

FIG. 4 illustrates a schematic diagram of the apparatus for applying the excitation to the resonant tank of the wireless power transfer system in accordance with various embodiments of the present disclosure. The bias voltage source 306 is configured to generate a predetermined dc voltage $V_{DC}$. The output of the bias voltage source 306 is connected to the power stage 304 through a switch S0 as shown in FIG. 4.

The controller 302 (shown in FIG. 3) configures the bias voltage source 306 and the switch S0 such that an excitation is applied to the resonant tank formed by Cp and L1. The excitation is applied to the resonant tank through two steps. In a first step, as shown in a dashed rectangle 402, the switch S0 is turned on. After the turn-on of the switch S0, $V_{DC}$ is applied to the resonant tank. In response to $V_{DC}$, a current flows from the bias voltage source 306 ($V_{DC}$) to ground through Cp, L1 and S4. In a second step, as shown in a dashed rectangle 404, the switch S0 is turned off. After the turn-off of the switch S0, two terminals of the resonant tank are shorted to ground. The current flows in a conductive loop formed by S2, Cp, L1 and S4. By turning on and off the switch S0, a voltage step (from $V_{DC}$ to zero) is applied to the inputs of the resonant thank. In response to this voltage step, a signal having a resonant attenuation envelope is generated in the resonant tank. This signal can be used to calculate the quality factor of the resonant tank. The signal having a resonant attenuation envelope will be discussed below with respect to FIG. 5.

Figure 5:
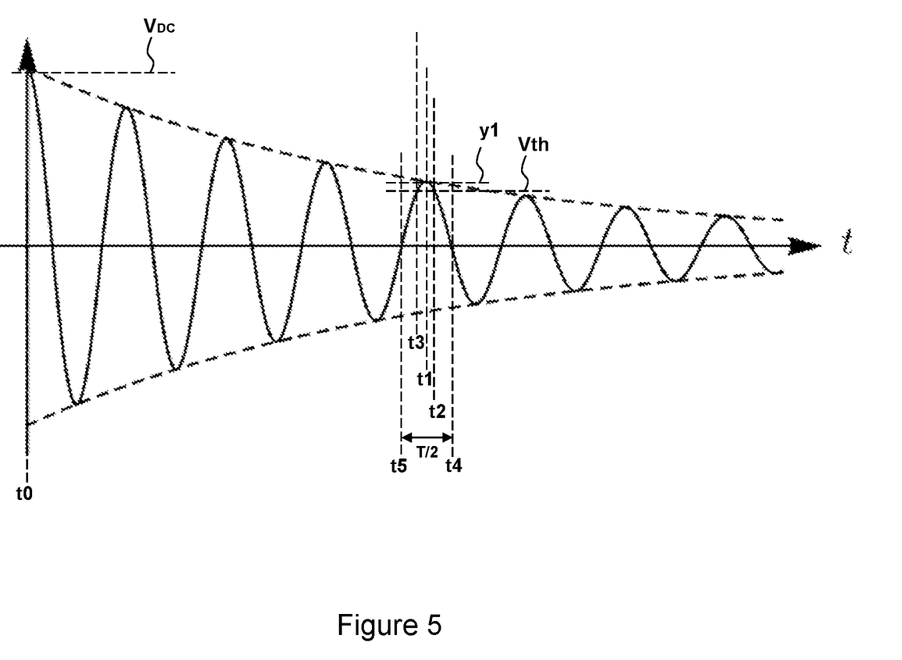
FIG. 5 illustrates a signal having a resonant attenuation envelope in accordance with various embodiments of the present disclosure.

FIG. 5 illustrates a signal having a resonant attenuation envelope in accordance with various embodiments of the present disclosure. After the excitation (e.g., a voltage step) is applied to the resonant tank formed by the coil L1 and the capacitor Cp, the voltage across the coil L1 has a damped sinusoidal waveform. This damped sinusoidal waveform has a resonant attenuation envelope as shown in FIG. 5.

It should be noted that the voltage signal shown in FIG. 5 is merely an example, which should not unduly limit the scope of the claims. One skilled in the art will recognize that the voltage signal across the coil is simply one manner of generating a damped sinusoidal waveform having a resonant attenuation envelope and that other and alternate embodiment methods could be employed. For example, the signal can be a current flowing through the resonant tank. This current has a resonant attenuation envelope.

As shown in FIG. 5, t2 is a last time instant at which a value of the damped sinusoidal waveform is equal to a predetermined threshold voltage Vth. Through a suitable sensor, t2 can be measured. As shown in FIG. 5, t1 is a time instant corresponding to a peak value of the damped sinusoidal waveform. The peak value y1 is the closest peak value adjacent to t2. As shown in FIGS. 5, t1 and t2 are in a same period of the damped sinusoidal waveform.

As shown in FIG. 5, the time instant t1 can be expressed as:

$$t1 = N \times T \quad (1)$$

In Equation (1), T is the period of the damped sinusoidal waveform. T can be measured through a suitable sensor. N is an integer. In the example illustrated in FIG. 5, N is equal to 4.

The peak value y1 can be expressed as:

$$Vth = y1 \times \sin\left(\frac{\frac{T}{4} - (t2 - t1)}{\frac{T}{4}} \times \frac{\pi}{2}\right) \quad (2)$$

In Equation (2), Vth is the predetermined threshold voltage. T is the period of the damped sinusoidal waveform. As shown in FIG. 5, the time between t4 and t5 is equal to one half of the period. The value of y1 can be obtained through solving Equation (2).

It should be noted that t2 and t3 are symmetrical with respect to t1. The difference of t2 and t1 (t2−t1) is equal to the difference of t1 and t3 (t1−t3).

According to the damped sinusoidal waveform, the peak value y1 can also be expressed as:

$$y1 = V_{DC} \times e^{-\frac{t1}{\tau}} \quad (3)$$

In Equation (3), $V_{DC}$ is the voltage level of the bias voltage source. $\tau$ is the time constant of the damped sinusoidal waveform. The time constant is used to indicate how rapidly an exponential function decays.

Equation (3) can be simplified as:

$$e^{\frac{t1}{\tau}} = V_{DC}/y1 \quad (4)$$

Equation (4) can be expressed as:

$$\frac{t1}{\tau} = \ln\left(\frac{V_{DC}}{y1}\right) \quad (5)$$

According to the definition of the time constant, $\tau$ can be expressed as:

$$\tau = \frac{2 \times L}{R} \quad (6)$$

In Equation (6), L is the equivalent inductance of the resonant tank. R is the equivalent resistance of the resonant tank. Equation (5) can be expressed as the following equation by substituting Equation (6) into Equation (5).

$$\frac{L}{R} = \frac{t1}{2 \times \ln\left(\frac{V_{DC}}{y1}\right)} \quad (7)$$

The quality factor of the resonant tank can be expressed by the following equation:

$$Q = \frac{L}{R} \times 2\pi \times f \quad (8)$$

In Equation (8), f is the frequency of the damped sinusoidal waveform. In some embodiments, the frequency of the damped sinusoidal waveform is equal to 100 KHz. The quality factor of the resonant tank can be expressed by the following equation by substituting Equation (7) into Equation (8).

$$Q = \frac{t1}{2 \times \ln\left(\frac{V_{DC}}{y1}\right)} \times 2\pi \times f \quad (9)$$

In Equation (9), t1 can be obtained from Equation (1). On the other hand, y1 can be obtained through solving Equation (2). $V_{DC}$ is the voltage level of the bias voltage source. From Equation (9), the quality factor Q can be calculated accurately.

In operation, a foreign object may be magnetically coupled to the resonant tank through the coil L1. The foreign object may have an impact on the values of L and R. More particularly, the foreign object may reduce the inductance of the coil and increase the equivalent series impedance. Such a change may result in a reduction of the quality factor of the resonant tank. As such, the value of the quality factor Q can indicate whether a foreign object has been magnetically coupled to the coil L1.

In operation, the controller 302 configures the bias voltage source 306 such that the bias voltage source 306 applies an excitation to the resonant tank through the power stage 304. In response to the excitation, a signal having a damped sinusoidal waveform is generated in the resonant tank. Depending on design needs, the signal can be the voltage across the coil of the resonant tank. Alternatively, the signal may be a current flowing through the resonant tank.

A suitable device is configured to record a start point ($V_{DC}$ and t0 shown in FIG. 5) of the signal having the damped sinusoidal waveform. The controller is configured to provide a predetermined threshold voltage (Vth). A suitable timing measurement sensor is configured to measure a resonant period (T) of the damped sinusoidal waveform. A sensor may be employed to measure the voltage across the coil of the resonant tank. The controller 302 receives the measured voltage. An algorithm is used to analyze the measured voltage (e.g., the voltage waveform shown in FIG. 5). The controller 302 is configured to record the last time instant (t2) at which the voltage of the damped sinusoidal waveform is equal to the predetermined threshold voltage Vth. As indicated by Equations (1) and (2), the algorithm is able to acquire the values of t1 and y1. The start point ($V_{DC}$ and t0) has been recorded. After having t1, y1, t0 and $V_{DC}$, the quality factor Q can be determined by solving Equation (9). Furthermore, based on the value of the quality factor Q, the algorithm can further determine whether a foreign object has been magnetically coupled to the coil L.

One advantageous feature of having the algorithm discussed above is the algorithm tends to have good accuracy when the quality factor is low. For example, when a foreign object is magnetically coupled to the coil L, the quality factor drops from a high quality factor value (e.g., from about 50 to about 60) to a low quality factor value (e.g., about 30). At such a low quality factor value, the measurement tolerance of the conventional quality factor algorithm is in a range from about −4% to about 4%. In contrast, the measurement tolerance of the quality factor algorithm discussed above is in a range from about −1% to about 1%.

Figure 6:
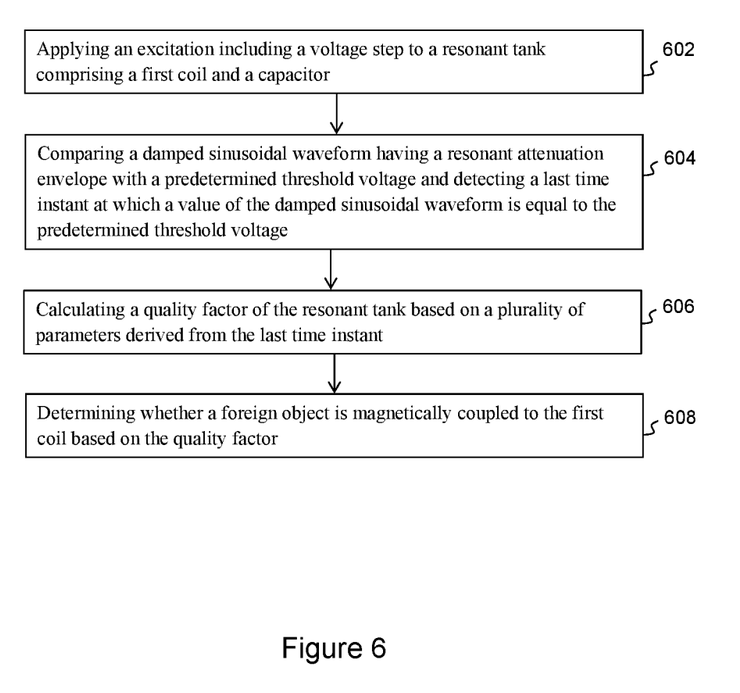
FIG. 6 illustrates a flow chart of a method for calculating a quality factor of the wireless power transfer system shown in FIG. 1 in accordance with various embodiments of the present disclosure.

FIG. 6 illustrates a flow chart of a method for calculating a quality factor of the wireless power transfer system shown in FIG. 1 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

A wireless power transfer system (e.g., wireless power transfer system shown in FIG. 1) comprises a transmitter and a receiver. The transmitter comprises a power stage, a resonant capacitor and a transmitter coil. The transmitter coil may be alternatively referred to as a first coil. The receiver comprises a receiver coil and a rectifier. The receiver coil may be alternatively referred to as a second coil. The transmitter coil is magnetically coupled to the receiver coil. In some embodiments, the transmitter may be a charging pad. The receiver may be a mobile phone. In order to detect a foreign object, a quality factor of the wireless power transfer system is calculated based on the steps below.

At step 602, an excitation including a voltage step is applied to a resonant tank comprising a first coil and a capacitor. The excitation is applied to the resonant tank through two steps. In a first step, a bias voltage source is connected to the resonant tank through turning on a switch. A current flows from the bias voltage source to ground through the resonant tank. In a second step, the bias voltage source is disconnected from the resonant tank through turning off the switch. The current flows in a conductive loop formed by the resonant tank and two low-side switches of the power stage. After turning off the switch, the voltage across the transmitter coil has a damped sinusoidal waveform (e.g., the damped sinusoidal waveform shown in FIG. 5).

At step 604, the damped sinusoidal waveform is compared with a predetermined threshold voltage. A suitable sensor is configured to detect a last time instant (e.g., t2 shown in FIG. 5) at which a value of the damped sinusoidal waveform is equal to the predetermined threshold voltage.

At step 606, the quality factor of the resonant tank is calculated based on a plurality of parameters (e.g., t1 and y1 shown in FIG. 5) derived from the last time instant. As discussed above with respect to FIG. 5, t2 is the last time instant. Based on t2, t1 can be calculated from Equation (1). Based on t1, t2 and the predetermined threshold voltage Vth, y1 can be calculated from Equation (2). Based on t1 and y1, the quality factor of the resonant tank can be calculated from Equation (9).

At step 608, a controller is configured to determine whether a foreign object is magnetically coupled to the transmitter coil based on the quality factor of the resonant tank. In some embodiments, a reduction of the quality factor of the resonant tank may indicate a foreign object is magnetically coupled to the transmitter coil.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for comprising:
    connecting a bias voltage source to a resonant tank of a wireless power transfer system, wherein a current flows from the bias voltage source to ground through the resonant tank and a first low-side switch of a power stage coupled to the resonant tank;

disconnecting the bias voltage source from the resonant tank, wherein the current flows in a conductive loop comprising the resonant tank, the first low-side switch of the power stage and a second low-side switch of the power stage, wherein after disconnecting the bias voltage source, a damped sinusoidal waveform is generated in the resonant tank comprising a first coil and a capacitor in response to a voltage step applied to the resonant tank;

comparing the damped sinusoidal waveform with a predetermined threshold voltage and detecting a last time instant at which a value of the damped sinusoidal waveform is equal to the predetermined threshold voltage, wherein prior to the last time instant, the damped sinusoidal waveform crosses the predetermined threshold voltage a plurality of times;

calculating a quality factor of the resonant tank based on a plurality of parameters derived from the last time instant; and determining whether a foreign object is magnetically coupled to the first coil of the wireless power transfer system based on the quality factor.

2. The method of claim 1, wherein:
the damped sinusoidal waveform is a voltage signal detected from the first coil.

3. The method of claim 1, further comprising:
determining whether the foreign object is magnetically coupled to the first coil based on a reduction of a value of the quality factor.

4. The method of claim 1, wherein the power stage comprises:
a first high-side switch and the first low-side switch connected in series between an input voltage bus and ground; and
a second high-side switch and the second low-side switch connected in series between the input voltage bus and ground, and wherein a common node of the first high-side switch and the first low-side switch is connected to a first input terminal of the resonant tank, and a common node of the second high-side switch and the second low-side switch is connected to a second input terminal of the resonant tank.

5. The method of claim 1, further comprising:
determining a peak value of the damped sinusoidal waveform based on the last time instant, wherein the peak value and the last time instant are in a same period of the damped sinusoidal waveform; and
calculating the quality factor based on a ratio of the voltage step to the peak value.

6. A method comprising:
connecting a dc voltage source to a power stage of a wireless power transfer system;
disconnecting the dc voltage source from the power stage, wherein after disconnecting the dc voltage source, a damped sinusoidal waveform is generated in a resonant tank of the wireless power transfer system, and wherein the power stage is connected to the resonant tank;
detecting a last time instant at which a value of the damped sinusoidal waveform is equal to a predetermined threshold voltage; and
calculating a quality factor of the resonant tank based on a plurality of parameters derived from the last time instant, wherein a controller configured to determine whether a foreign object is magnetically coupled to the first coil based on the quality factor.

7. The method of claim 6, wherein:
the resonant tank comprises a resonant capacitor and a first coil.

8. The method of claim 7, wherein:
the power stage is a full-bridge power converter.

9. The method of claim 8, further comprising:
determining a time instant corresponding to a peak value of the damped sinusoidal waveform based on the last time instant, wherein the time instant and the last time instant are in a same period of the damped sinusoidal waveform; and
determining the peak value of the damped sinusoidal waveform based on the last time instant, the time instant and the predetermined threshold voltage.

10. The method of claim 9, further comprising:
calculating the quality factor based on the time instant and a ratio of an output voltage of the dc voltage source to the peak value.

11. An apparatus comprising:
a power conversion device coupled to a resonant tank comprising a capacitor and a first coil connected in series; and
a controller configured to apply an excitation to the capacitor and the first coil through the power conversion device, detect a signal having a resonant attenuation envelope, compare the signal with a predetermined threshold voltage, and detect a last time instant at which a value of the signal is equal to the predetermined threshold voltage, and wherein the controller is configured to determine a quality factor based on the last time instant.

12. The apparatus of claim 11, wherein:
the power conversion device is a full-bridge converter.

13. The apparatus of claim 12, wherein the full-bridge converter comprises:
a first high-side switch and a first low-side switch connected in series between an input voltage bus and ground; and
a second high-side switch and a second low-side switch connected in series between the input voltage bus and ground, and wherein a common node of the first high-side switch and the first low-side switch is connected to the capacitor, and a common node of the second high-side switch and the second low-side switch is connected to the first coil.

14. The apparatus of claim 13, further comprising:
a bias voltage source connected to the power conversion device through a switch.

15. The apparatus of claim 14, wherein:
the bias voltage source is connected to the resonant tank through turning on the switch, wherein after turning on the switch, a current flows from the bias voltage source to ground through the resonant tank and the second low-side switch of the power conversion device; and
the bias voltage source is disconnected from the resonant tank through turning off the switch, wherein after turning off the switch, the current flows in a conductive loop comprising the resonant tank, the first low-side switch of the power conversion device and the second low-side switch of the power conversion device.

16. The apparatus of claim 11, wherein the first coil is configured to be magnetically coupled to a second coil, and wherein:
the first coil is a transmitter coil of a wireless power transfer system; and
the second coil is a receiver coil of the wireless power transfer system.

17. The apparatus of claim 11, wherein:
the signal has a damped sinusoidal waveform.

18. The apparatus of claim 17, wherein:
the damped sinusoidal waveform is a voltage signal detected from the first coil.

19. The apparatus of claim 11, wherein:
the controller is configured to determine whether a foreign object is magnetically coupled to the first coil based on the quality factor.

* * * * *